US012126854B2

(12) United States Patent
Epari

(10) Patent No.: US 12,126,854 B2
(45) Date of Patent: Oct. 22, 2024

(54) METHOD AND SYSTEM FOR CREATING THEATRICAL EFFECT INFORMATION THROUGH AN ADDITIONAL TRACK

(71) Applicant: ARRIS Enterprises LLC, Suwanee, GA (US)

(72) Inventor: Aurovind Sagar Epari, Karnataka (IN)

(73) Assignee: ARRIS Enterprises LLC, Horsham, PA (US)

( * ) Notice: Subject to any disclaimer, the term of this patent is extended or adjusted under 35 U.S.C. 154(b) by 50 days.

(21) Appl. No.: 17/718,788

(22) Filed: Apr. 12, 2022

(65) Prior Publication Data

US 2022/0394324 A1    Dec. 8, 2022

Related U.S. Application Data

(60) Provisional application No. 63/197,654, filed on Jun. 7, 2021.

(51) Int. Cl.
*H04N 21/431* (2011.01)
*G06F 16/48* (2019.01)
*G06F 16/483* (2019.01)
*H04N 21/235* (2011.01)

(52) U.S. Cl.
CPC ....... *H04N 21/4312* (2013.01); *G06F 16/483* (2019.01); *G06F 16/489* (2019.01); *H04N 21/235* (2013.01)

(58) Field of Classification Search
CPC ......................... H04N 21/4312; H04N 21/235; G06F 16/489; G06F 16/483
See application file for complete search history.

(56) References Cited

U.S. PATENT DOCUMENTS

| 11,070,869 | B2* | 7/2021 | Ribeiro De Oliveira ................... H04N 21/4348 |
| 2014/0229970 | A1* | 8/2014 | Besehanic .......... H04N 21/6175 725/20 |
| 2019/0034380 | A1* | 1/2019 | Freitas ..................... G06F 16/48 |
| 2019/0325067 | A1* | 10/2019 | Vaughn ................... G10L 15/26 |
| 2021/0083942 | A1* | 3/2021 | Finkelstein ............. H04L 67/12 |
| 2021/0144422 | A1* | 5/2021 | Wagner .............. H04N 21/4131 |

OTHER PUBLICATIONS

WebVTT: The Web Video Text Tracks Format, W3C Candidate Recommendation Apr. 4, 2019, w3.org/TR/webvtt1/ <https://www.w3.org/TR/webvtt1/>, Apr. 4, 2019.

* cited by examiner

*Primary Examiner* — Mulugeta Mengesha
(74) *Attorney, Agent, or Firm* — Panitch Schwarze Belisario & Nadel LLC

(57) ABSTRACT

A method, a media device, and a non-transitory computer readable medium for creating a theatrical effect. The method includes receiving, on a media device, a theatrical track; parsing, by the media device, the theatrical track to retrieve Internet of Things metadata; generating, by the media device, Internet of Things instructions from the Internet of Things metadata; and publishing, by the media device, the Internet of Things instructions with presentation timestamps for one or more Internet of Things devices.

20 Claims, 4 Drawing Sheets

METHOD AND SYSTEM FOR CREATING THEATRICAL EFFECT INFORMATION THROUGH AN ADDITIONAL TRACK

TECHNICAL FIELD

The present disclosure generally relates to a method and system for theatrical effect information through an additional track.

BACKGROUND

Cable service providers, which are also referred to as Multiple System Operators ("MSO"), or any communication or content distribution business that operates through a cable network, renders its services to its subscribers. The services can include, but are not limited to, different subscription plans for broadband Internet access and telephony. In order to consume these services, subscribers connect to a private network owned (or co-owned or rented) by the broadband cable operator which is implemented according to the Data Over Cable Service Interface Specification (DOCSIS) standard.

To provide television and data services, a MSO typically uses a Cable Modem Termination System ("CMTS") for the data services and a quadrature amplitude modulation ("QAM") multiplexer for downstream broadcast television, narrow cast and VoD traffic signals. These devices may be located at one or more hubs, which are typically connected to a head end via a network according to a networking protocol, such as Ethernet or SONET. A residential cable customer is typically connected to the CMTS and hub via a cable modem and a wireless router that may be combined in a single box which is called a gateway. In order to view video content that is transmitted through the cable modem or gateway, residential customers connect their televisions to a set-top box (STB). Since set-top boxes have recently gained additional features and functionality, they are often referred to as a smart media device ("SMD") and can be considered as the network interface controller for their peripheral devices.

The set-top box can be used by the subscriber to access a variety of multimedia services, including but not limited to live or linear television, digital video recorder (DVR) content, video-on-demand (VoD) content, over-the-top (OTT) content, and others. For example, set-top boxes usually play user selected content, for example, either live or with a digital video recorder (DVR).

In addition, with the emergence of "Internet of Things" (IoT) devices, media contents can be improvised runtime to create a theatrical ambience. Existing practices are known to create runtime effect by post processing the media content, for example, by analyzing the HDMI color information and creating a visual effect by passing the color information to IoT enabled light bulbs.

It would be desirable to create a better theatrical effect, for example, with lights or sound, by pre-feeding the necessary data along with the content. The theatrical effect IoT metadata can be transmitted along with the media content, for example, via an additional track (e.g., a Web Video Text Tracks (WebVTT)). The media device, for example, an IoT enabled device, can propagate the instructions to an IoT broker, and the IoT broker can publish these instructions to the desired IoT devices/clients to create the necessary theatrical effect.

SUMMARY

It would be desirable to create theatrical effect using the theatrical metadata available in the additional theatrical track, and wherein the media device can download the theatrical track along with audiovisual (AV) content via an additional track, for example, WebVTT, parse the theatrical track to retrieve the metadata, and providing the metadata with presentation timestamp (PTS) information to one or more IoT devices.

In accordance with an aspect, a method is disclosed for creating a theatrical effect, the method comprising: receiving, on a media device, a theatrical track; parsing, by the media device, the theatrical track to retrieve Internet of Things metadata; generating, by the media device, Internet of Things instructions from the Internet of Things metadata; and publishing, by the media device, the Internet of Things instructions with presentation timestamps for one or more Internet of Things devices.

In accordance with another aspect, a media device is disclosed comprising: a processor configured to: receive a theatrical track; parse the theatrical track to retrieve Internet of Things metadata; generate Internet of Things instructions from the Internet of Things metadata; and publish the Internet of Things instructions with presentation timestamps for one or more Internet of Things devices.

In accordance with an aspect, a non-transitory computer readable medium is disclosed having instructions operable to cause one or more processors to perform operations comprising: receiving, on a media device, a theatrical track; parsing, by the media device, the theatrical track to retrieve Internet of Things metadata; generating, by the media device, Internet of Things instructions from the Internet of Things metadata; and publishing, by the media device, the Internet of Things instructions with presentation timestamps for one or more Internet of Things devices.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

System for Creating Theatrical Effect Information Through an Additional Track

Figure 1:
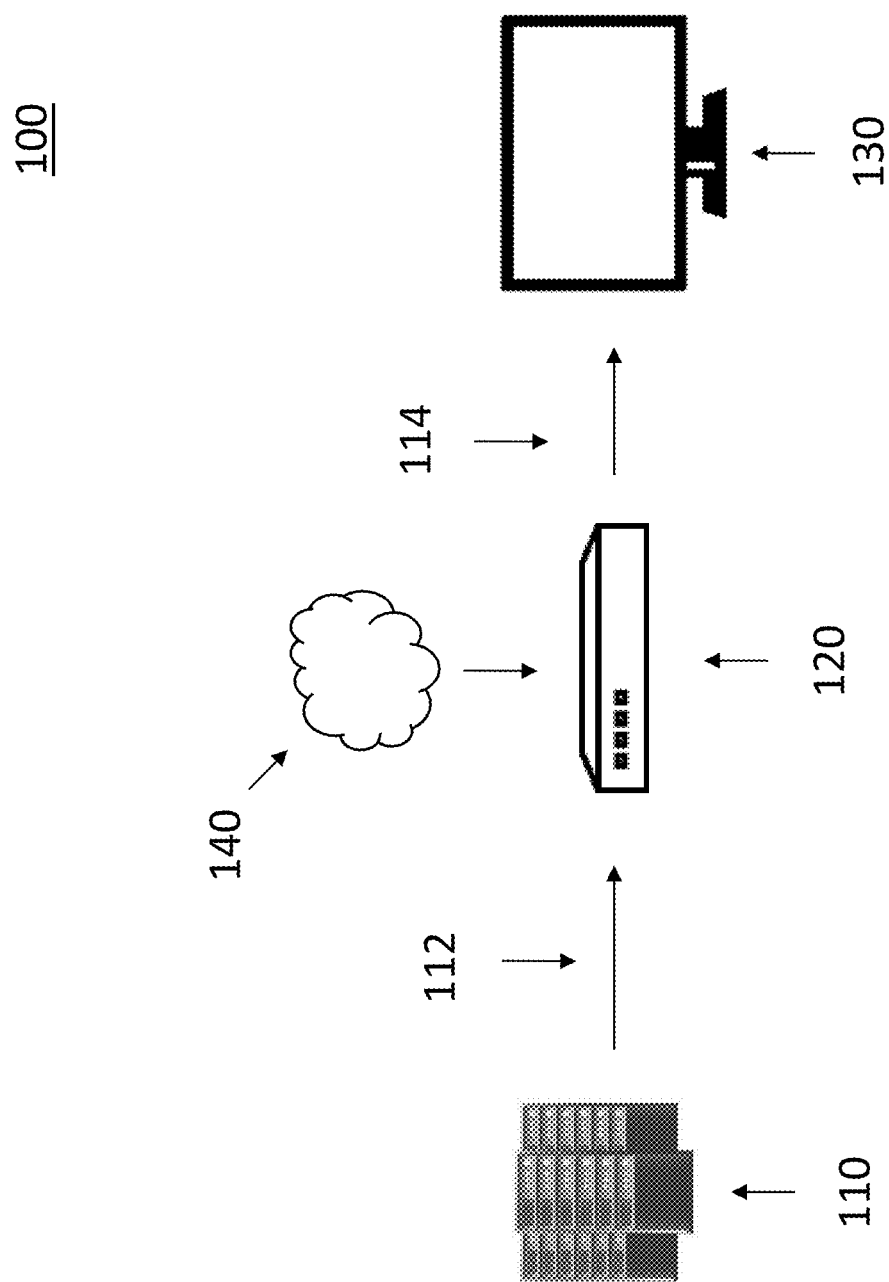
FIG. 1 is an illustration of an exemplary network environment for a method and system for creating theatrical effect information through an additional track in accordance with an exemplary embodiment.

FIG. 1 is a block diagram illustrating an example network environment 100 for creating and displaying theatrical effect information through an additional track. In embodiments, a cable provider (or MSO) server 110 can provide, for example, media content, for example, video and/or data services to a media device 120, for example, a customer premise equipment (CPE). In accordance with an embodiment, the media device 120 can be a modem, a set-top box, a wireless router including an embedded modem, or a media gateway, among many others (e.g., digital subscriber line (DSL) modem, voice over internet protocol (VOIP) terminal adapter, video game console, digital versatile disc (DVD) player, communications device, hotspot device, etc.). The media device 120 may communicate with one or more media play devices 130 over a local network 114 (for example, a local area network (LAN), a wireless local area network (WLAN), a personal area network (PAN), etc.) and/or wired, for example, a television. The media device 120 may communicate with an upstream wide area network (WAN) 112 to the cable provider server 110. In accordance with an embodiment, the cable provider server 110 can provide high-bandwidth data transfer, for example, media content, cable television and broadband internet access.

In accordance with an exemplary embodiment, the media player 130 may be any type of computing device configured to connect via a wireless network, for example, wireless network utilizing an IEEE 802.11 specification, including a smart phone, a smart TV, a computer, a mobile device, a tablet, or any other device operable to communicate wirelessly with the media device 120. In accordance with an alternative embodiment, the media player 130 can be a television, for example, that is directly connected to the media device 120, for example, by an HDMI cable.

In accordance with an exemplary embodiment, the media device 120 may communicate with the cable provider server 110 over a wired or a wireless connection. A wireless connection between the cable provider server 110 and the media device 120 may be established through a protected setup sequence (for example, Wi-Fi protected setup (WPS)). The protected setup sequence may include the steps of scanning multiple wireless channels for an available access point, exchanging one or more messages between a station and access point, exchanging key messages (for example, pre-shared key (PSK)) between the station and access point, and installing a key (for example, PSK) at the station.

As set forth, the media device 120, for example, customer premise equipment (CPE), typically provides access a variety of multimedia services, including but not limited to live or linear television, digital video recorder (DVR) content, video-on-demand (VoD) content, over-the-top (OTT) content, and others. Alternatively, the customer premise equipment 120 can receive Internet Protocol-based (IP-based) streaming content from through the upstream wide area network (WAN) 112 and cable provider server 110. In embodiments, various data, multimedia, and/or voice services may be delivered to the media device 120 including but not limited to, live or broadcast television, video-on-demand (VoD) content, pay-per view content, recorded content (e.g., DVR content), audio-only content, streaming content, and others. The media device 120 may process and output content to one or more media play devices 130 such as a television, mobile device, tablet, computer, and any other device operable to receive video, voice, and/or data services.

In accordance with an exemplary embodiment, the system 100 can also include one or more cloud servers 140 configured to provide audiovisual (AV) content and/or theatrical tracks as disclosed herein to the media device 120.

Computer System Architecture

Figure 2:
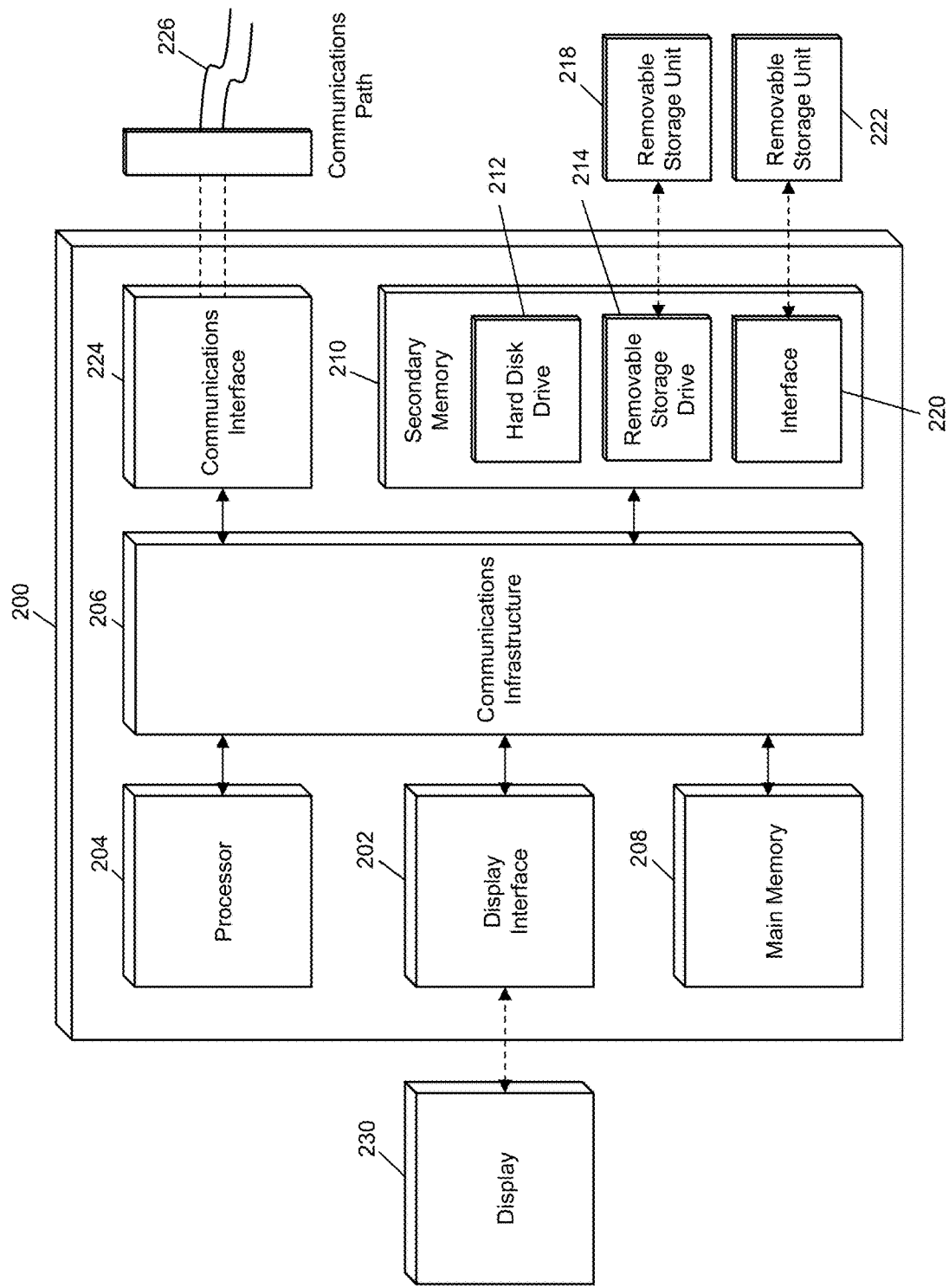
FIG. 2 is an exemplary hardware architecture for an embodiment of a communication device.

FIG. 2 illustrates a representative computer system 200 in which embodiments of the present disclosure, or portions thereof, may be implemented as computer-readable code executed on hardware. For example, the cable provider server 110, the media device 120, and the media player 130, the one or more cloud servers 140, and an IoT broker 340 of FIGS. 1, 3 and 4 may be implemented in whole or in part by a computer system 200 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 218, a removable storage unit 222, and a hard disk installed in hard disk drive 212.

Various embodiments of the present disclosure are described in terms of this representative computer system 200. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 204 may be processor device specifically configured to perform the functions discussed herein. The processor device 204 may be connected to a communications infrastructure 206, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 200 may also include a main memory 208 (e.g., random access memory, read-only memory, etc.), and may also include a secondary memory 210. The secondary memory 210 may include the hard disk drive 212 and a removable storage drive 214, such as a floppy disk drive, a magnetic tape drive, an optical disk drive, a flash memory, etc.

The removable storage drive 214 may read from and/or write to the removable storage unit 218 in a well-known manner. The removable storage unit 218 may include a removable storage media that may be read by and written to by the removable storage drive 214. For example, if the removable storage drive 214 is a floppy disk drive or universal serial bus port, the removable storage unit 218 may be a floppy disk or portable flash drive, respectively. In one embodiment, the removable storage unit 218 may be non-transitory computer readable recording media.

In some embodiments, the secondary memory 210 may include alternative means for allowing computer programs or other instructions to be loaded into the computer system 200, for example, the removable storage unit 222 and an interface 220. Examples of such means may include a program cartridge and cartridge interface (e.g., as found in video game systems), a removable memory chip (e.g., EEPROM, PROM, etc.) and associated socket, and other removable storage units 222 and interfaces 220 as will be apparent to persons having skill in the relevant art.

Data stored in the computer system 200 (e.g., in the main memory 208 and/or the secondary memory 210) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 200 may also include a communications interface 224. The communications interface 224 may be configured to allow software and data to be transferred between the computer system 200 and external devices. Exemplary communications interfaces 224 may include a modem, a network interface (e.g., an Ethernet card), a communications port, a PCMCIA slot and card, etc. Software and data transferred via the communications interface 224 may be in the form of signals, which may be electronic, electromagnetic, optical, or other signals as will be apparent to persons having skill in the relevant art. The signals may travel via a communications path 226, which may be configured to carry the signals and may be implemented using wire, cable, fiber optics, a phone line, a cellular phone link, a radio frequency link, etc.

The computer system 200 may further include a display interface 202. The display interface 202 may be configured to allow data to be transferred between the computer system 200 and external display 230. Exemplary display interfaces 202 may include high-definition multimedia interface (HDMI), digital visual interface (DVI), video graphics array (VGA), etc. The display 230 may be any suitable type of display for displaying data transmitted via the display interface 202 of the computer system 200, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 208 and secondary memory 210, which may be memory semiconductors (e.g., DRAMs, etc.). These computer program products may be means for providing software to the computer system 200. Computer programs (e.g., computer control logic) may be stored in the main memory 208 and/or the secondary memory 210. Computer programs may also be received via the communications interface 224. Such computer programs, when executed, may enable computer system 200 to implement the present methods as discussed herein. In particular, the computer programs, when executed, may enable processor device 204 to implement the methods illustrated by FIGS. 1, 3, and 4 as discussed herein. Accordingly, such computer programs may represent controllers of the computer system 200. Where the present disclosure is implemented using software executed on hardware, the software may be stored in a computer program product and loaded into the computer system 200 using the removable storage drive 214, interface 220, and hard disk drive 212, or communications interface 224.

The processor device 204 may comprise one or more modules or engines configured to perform the functions of the computer system 200. Each of the modules or engines may be implemented using hardware and, in some instances, may also utilize software executed on hardware, such as corresponding to program code and/or programs stored in the main memory 208 or secondary memory 210. In such instances, program code may be compiled by the processor device 204 (e.g., by a compiling module or engine) prior to execution by the hardware of the computer system 200. For example, the program code may be source code written in a programming language that is translated into a lower level language, such as assembly language or machine code, for execution by the processor device 204 and/or any additional hardware components of the computer system 200. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 200 to perform the functions disclosed herein. It will be apparent to persons having skill in the relevant art that such processes result in the computer system 200 being a specially configured computer system 200 uniquely programmed to perform the functions discussed above.

System for Creating Theatrical Effect Information Through an Additional Track

Figure 3:
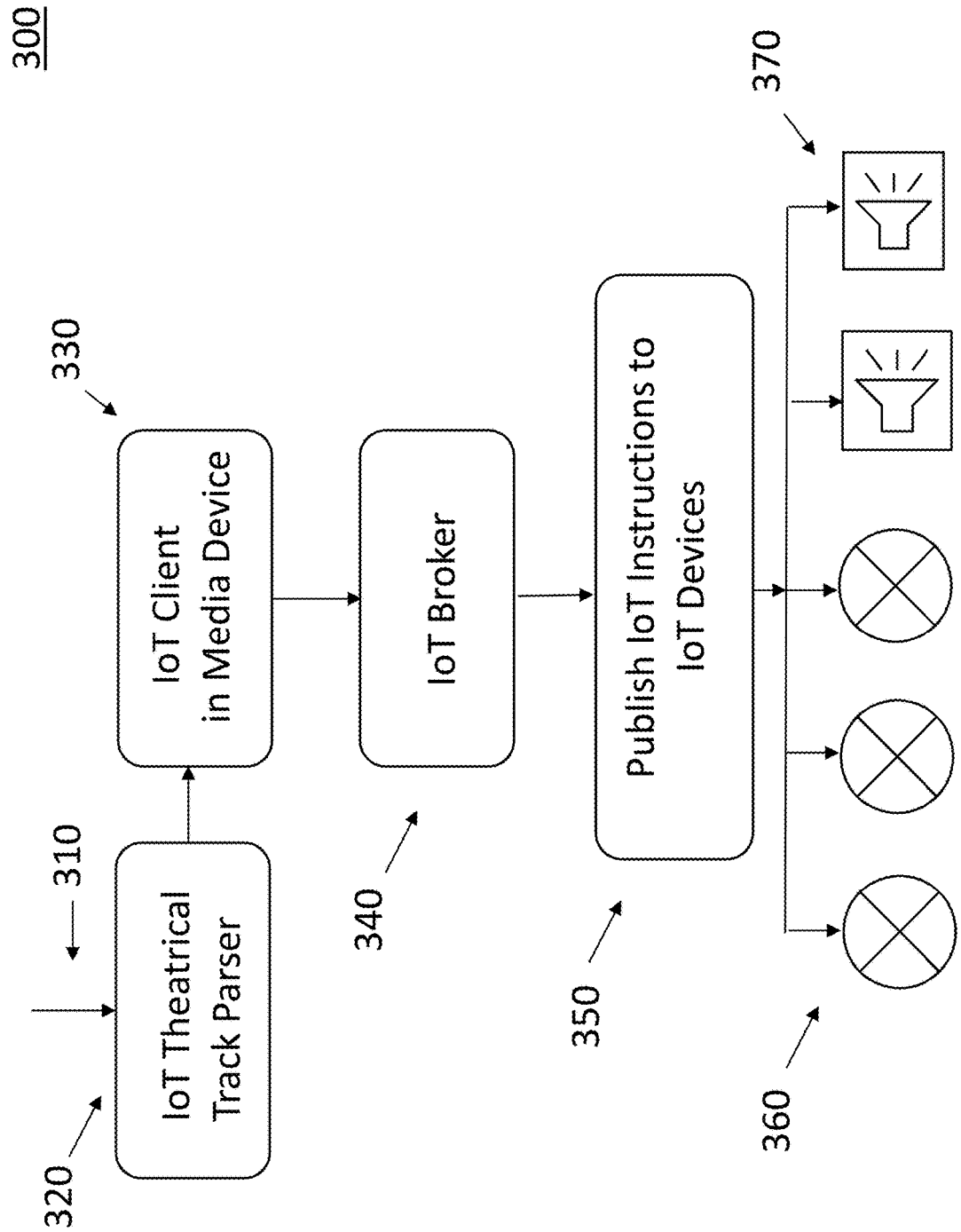
FIG. 3 illustrates a representative system for creating theatrical effect information through an additional track in accordance with an exemplary embodiment.

FIG. 3 illustrates a representative system 300 for creating theatrical effect information through an additional track in accordance with an exemplary embodiment. As shown in FIG. 3, a playlist 310, for example, audiovisual content can be received by the media device 120 from the cable provider server 110 or the one or more cloud servers 140. In accordance with an exemplary embodiment, the playlist 310, for example, can include IoT theatrical chunks, which are received by the media device 120 and directed by the media device 120 to an IoT theatrical track parser 320. For example, the theatrical chucks can embedded in the playlist 310. In an alternative embodiment, the theatrical chunks can be received separately from the playlist 310 from a third-party provider, or alternatively, for example, can be created locally, for example, on the media device 120. The media device 120, for example, can receive the playlist 310 and based on video within the playlist, the media device 120 can be configured to interpret the video content and generate IoT theatrical chucks based on the video content. For example, color values within the video content can be identified and corresponding lights within the IoT device 350 can be identified to be illuminated within a scene.

In accordance with an exemplary embodiment, the IoT theatrical track parser 320 will parse the IoT metadata from the playlist 310 and send the parsed IoT metadata with presentation timestamps to an IoT client 330 in the media device 120 for management of the IoT metadata. The IoT metadata is then published by the IoT client 330 to an IoT broker 340. In accordance with an exemplary embodiment, the IoT broker 340 can be housed within the media device 120. Alternatively, the IoT broker 340 can be a separate unit that is configured to receive the published IoT metadata and the presentation timestamps from the media device 120 and delivers the published IoT instructions to the one or more IoT devices 350. In accordance with an exemplary embodiment, the IoT broker 340 within the media player 120 or separate device can communicate with the IoT devices 350 over a wired or a wireless connection. For example, the IoT broker 340 and the one or more IoT devices 350 can communicate via a wireless technology such as Bluetooth®.

In turn, the IoT broker 340 will publish the IoT instructions to one or more IoT devices 350, which can include, for example, one or more lights 360 and one or more speakers 370. For example, the one or more lights 360 can include one or more of a green bulb, a blue bulb, a yellow bulb, a red bulb, and a white bulb. In addition, each of the green bulb, the blue bulb, the yellow bulb, the red bulb, and the white bulb can have a luminosity percentage, for example, which is a measurement of radiated electromagnetic power (light) being emitted by each of the corresponding light bulbs. In addition, the one or more speakers 370 can include a setting for one or more of bass and treble, and a corresponding percentage of bass (e.g., low frequencies) and/or treble (e.g., high frequencies) being output by each of the one or more speakers 370. The one or more lights 360 can be housed in a single unit or alternatively, each of the one or more lights 360 can be a separate light. In addition, each of the one or more speakers 370 can be, for example, housed within a single cabinet, for example, a sound bar having a rather wide enclosure.

In accordance with an exemplary embodiment, for example, the theatrical track can be as follows:

```
00:00:00.500-->00:00:2:000
<Lighting>
   GreenBulb:On,Luminosity: 20%,BlueBulb:On,Luminosity: 50%,
RedBulb:On,Luminosity:10%,YellowBulb:On,Luminosity:90%,WhiteBulb:Off
</Lighting>
<Sound>
   Bass:50%,Treble:20%
</Sound>
00:00:02.500-->00:00:4:300
<Lighting>
   GreenBulb:Off,BlueBulb:Off,RedBulb:On,Luminosity:100%,
YellowBulb:Off,Luminosity:90%,WhiteBulb:On,Luminosity:10%f
</Lighting>
<Sound>
   Bass:10%,Treble:80%
</Sound>
```

In accordance with an exemplary embodiment, the theatrical content can be received by the media device 120 via WebVTT. The media player 120 can parse the theatrical track to retrieve the metadata as disclosed above, which metadata will be available with the presentation timestamps (e.g., presentation timestamp metadata) associated with the audiovisual content. For example, the theatrical effect metadata can be embedded as part of the WebVTT comment section, and the WebVTT parser will select and identify the metadata as IoT data using, for example, an IoT tag. For example, the WebVTT data can appear as comments as follows:

Note—"<IoT> blue-bulb <pts>luminosity=20"
Note—"<IoT> red-bulb <pts>luminosity=10"
Note—"<IoT> Bass <pts>percentage=30"
Note—"<IoT> Treble <pts>percentage=20"

In accordance with an exemplary embodiment, comments can be included in the WebVTT file and can appear as blocks that are preceded, for example, by a blank line, start with word "NOTE" (followed by a space or newline), and end at the first blank line.

In accordance with an exemplary embodiment, the theatrical tracks can be received by the media device 120, for example, via closed caption data over quadrature amplitude modulation (QAM), Dynamic Adaptive Steaming over HTTP (MPEG-DASH), subtitles with the audiovisual content (e.g., translated text in a language different than a language of the audio), and web content that is viewed on a web browser supporting WebVTT or transfer of metadata.

Method for Creating Theatrical Effect Information Through an Additional Track

Figure 4:
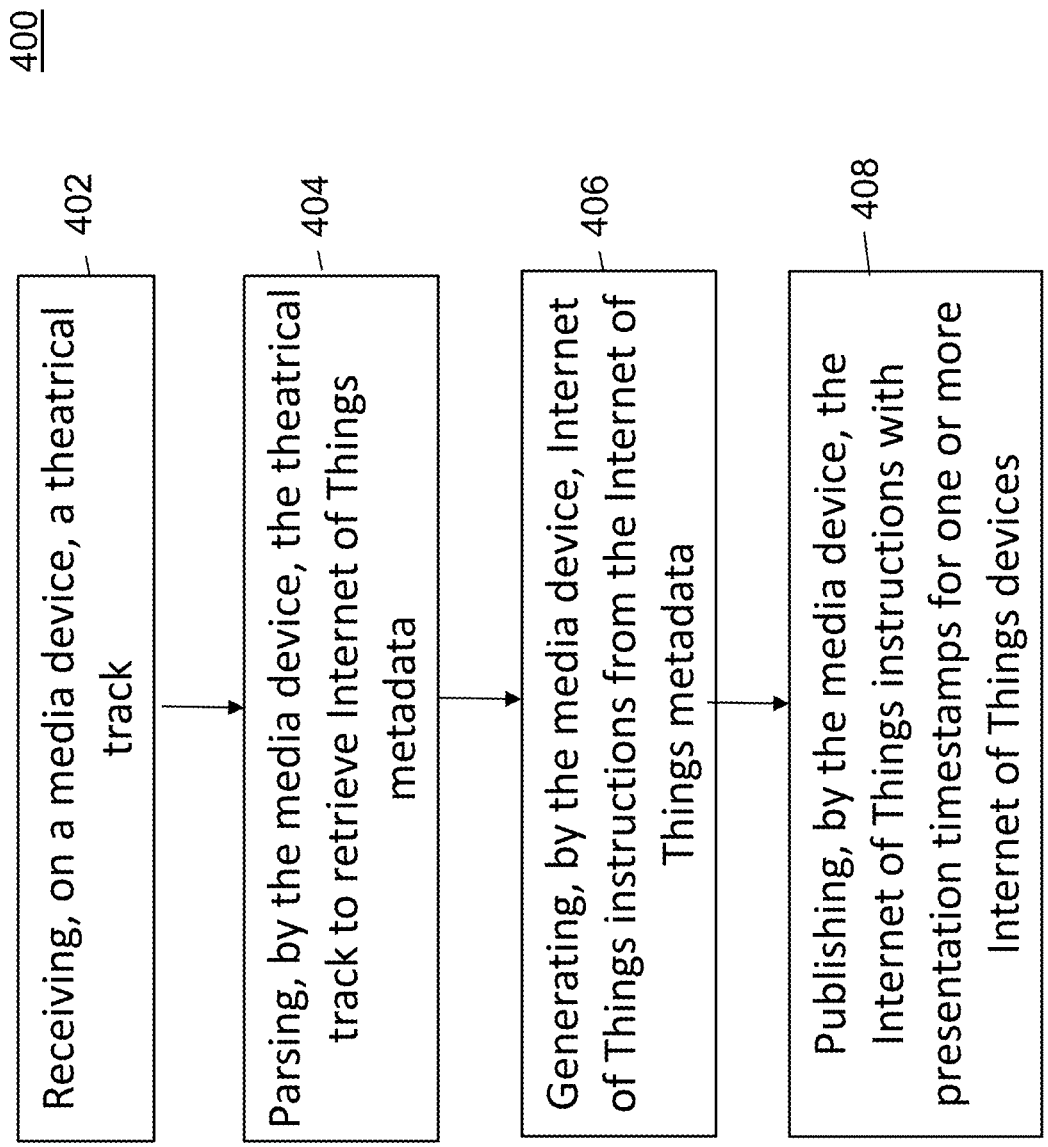
FIG. 4 is a flow chart of a method for creating theatrical effect through an additional track in accordance with an embodiment.

FIG. 4 is a flow chart 400 of a method for creating theatrical effect through an additional track in accordance with an embodiment. As shown in FIG. 4, in step 402, a theatrical track is received on a media device 120. In step 404, the theatrical track is parsed by the media device 120 to retrieve Internet of Things metadata. In step 406, Internet of Things instructions are generated by the media device 120 from the Internet of Things metadata. In step 408, the Internet of Things instructions with presentation timestamps are published by the media device 120 for one or more Internet of Things devices 350.

In accordance with an exemplary embodiment, audiovisual content can be received on the media device 120, and the audiovisual content is sent by the media device 120 to a media player 130. The audiovisual content includes presentation timestamps that can be synchronized with presentation timestamps for the Internet of Things instructions during playback of the audiovisual content. The audiovisual content with the theatrical track, for example, can be received by the media device 120 from a cable provider server 110.

In accordance with an exemplary embodiment, the theatrical track can be received by the media device 120 from one of the following: a producer of the audiovisual content, a third-party provider with the audiovisual content, the third-party without the audiovisual content, or a user viewing the audiovisual content.

In accordance with an exemplary embodiment, audiovisual content with the theatrical track embedded in the audiovisual content can be received by the media device 120, and the Internet of Things instructions can be created by the media device 120 from the embedded theatrical track in the audiovisual content. For example, the audiovisual content with the theatrical track embedded in the audiovisual content can be received by the media device 120 via a Web Video Text Tracks (WebVTT) standard, and the theatrical track is parsed by the media device 120 to retrieve the Internet of Things metadata with an Internet of Things theatrical parser hosted on the media device 120. The Internet of Things instructions can be managed with an Internet of Things broker 340. For example, the Internet of Things broker 340 can be housed within the media device 120 120, or alternatively, the Internet of Things broker 340 can be a separate unit.

In accordance with an exemplary embodiment, the media device 120 can receive audiovisual content with the theatrical track embedded with closed captioning information associated with the audiovisual content. The one or more Internet of Things devices 350 comprise one or more of a light 360 and a speaker 370, and wherein the Internet of Things instructions can be published by the media device 120 to the one or more of the light 360 and the speaker 370, the Internet of Things instructions including turning the light on or off with a luminosity setting when the light is on, and adjusting one or more of a bass setting and a treble setting on the speaker 370. In accordance with an exemplary embodiment, the one or more of the light 360 and the speaker 370 comprises a plurality of lights 360 and at least one sound bar 370, and the media device 120 is a set-top box.

In accordance with an alternative embodiment, audiovisual content and the theatrical track can be received by the media device 120 in a quadrature amplitude modulation (QAM) format from a cable provider server 110.

Techniques consistent with the present disclosure provide, among other features, systems and methods for previewing content while playing selecting content. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for creating a theatrical effect, the method comprising:
    receiving, on a computer device, audiovisual content and a theatrical track for the audiovisual content, the theatrical track including Internet of Things metadata;
    parsing, by the computer device, the theatrical track to retrieve the Internet of Things metadata;
    generating, by the computer device, Internet of Things instructions from the Internet of Things metadata; and
    publishing, by the computer device, the Internet of Things instructions with presentation timestamps for one or more Internet of Things devices.

2. The method according to claim 1, further comprising: sending, by the computer device, the audiovisual content to a media player.

3. The method according to claim 1, further comprising: receiving, by the computer device, the audiovisual content and the theatrical track from a cable provider server.

4. The method according to claim 1, further comprising: receiving, by the computer device, the theatrical track from one of the following:
    a producer of the audiovisual content, a third-party provider with the audiovisual content, the third-party without the audiovisual content, or a user viewing the audiovisual content.

5. The method according to claim 1, wherein the theatrical track is embedded in the audiovisual content, the method further comprising:
    creating, by the computer device, the Internet of Things instructions from the embedded theatrical track in the audiovisual content.

6. The method according to claim 1, wherein the theatrical track is embedded in the audiovisual content and the audiovisual content is received via a Web Video Text Tracks (WebVTT) standard, the method further comprising:
    parsing, by the computer device, the theatrical track to retrieve the Internet of Things metadata with an Internet of Things theatrical parser hosted on the computer device; and
    managing the Internet of Things instructions with an Internet of Things broker.

7. The method according to claim 1, wherein the theatrical track is embedded with closed captioning information associated with the audiovisual content.

8. The method according to claim 1, wherein the one or more IoT devices comprise one or more of a light and a speaker, the method further comprising:
    publishing, by the computer device, the Internet of Things instructions to the one or more of the light and the speaker, the Internet of Things instructions including turning the light on or off with a luminosity setting when the light is on, and adjusting one or more of a bass setting and a treble setting on the speaker.

9. The method according to claim 8, wherein the one or more of the light and the speaker comprises a plurality of lights and at least one sound bar, and the computer device is a set-top box.

10. The method according to claim 1, wherein the audiovisual content and the theatrical track are received in a quadrature amplitude modulation (QAM) format from a cable provider server.

11. A computer device comprising:
    a processor configured to:
        receive audiovisual content and a theatrical track for the audiovisual content, the theatrical track including Internet of Things metadata;
        parse the theatrical track to retrieve the Internet of Things metadata;
        generate Internet of Things instructions from the Internet of Things metadata; and
        publish the Internet of Things instructions with presentation timestamps for one or more Internet of Things devices.

12. The computer device according to claim 11, wherein the processor is further configured to:
    send the audiovisual content to a media player.

13. The computer device according to claim 11, wherein the processor is further configured to:
    receive the theatrical track from one of the following:
        a producer of the audiovisual content, a third-party provider with the audiovisual content, the third-party without the audiovisual content, or a user viewing the audiovisual content.

14. The computer device according to claim 11, wherein the theatrical track is embedded in the audiovisual content, and the processor is further configured to:
    create the Internet of Things instructions from the embedded theatrical track in the audiovisual content.

15. The computer device according to claim 11, wherein the theatrical track is embedded in the audiovisual content and the audiovisual content is received via a Web Video Text Tracks (WebVTT) standard and the processor is further configured to:
- parse the theatrical track to retrieve the Internet of Things metadata with an Internet of Things theatrical parser hosted on the computer device; and
- manage the Internet of Things instructions with an Internet of Things broker.

16. A non-transitory computer readable medium having instructions operable to cause one or more processors to perform operations comprising:
- receiving, on a computer device, audiovisual content and a theatrical track for the audiovisual content, the theatrical track including Internet of Things metadata;
- parsing, by the computer device, the theatrical track to retrieve the Internet of Things metadata;
- generating, by the computer device, Internet of Things instructions from the Internet of Things metadata; and
- publishing, by the computer device, the Internet of Things instructions with presentation timestamps for one or more Internet of Things devices.

17. The non-transitory computer readable medium according to claim 16, further comprising:
- sending, by the computer device, the audiovisual content to a media player.

18. The non-transitory computer readable medium according to claim 16, further comprising:
- receiving, by the computer device, the theatrical track from one of the following:
- a producer of the audiovisual content, a third-party provider with the audiovisual content, the third-party without the audiovisual content, or a user viewing the audiovisual content.

19. The non-transitory computer readable medium according to claim 16, wherein the theatrical track is embedded in the audiovisual content; and
- creating, by the computer device, the Internet of Things instructions from the embedded theatrical track in the audiovisual content.

20. The non-transitory computer readable medium according to claim 16, wherein the theatrical track is embedded in the audiovisual content and the audiovisual content is received via a Web Video Text Tracks (WebVTT) standard;
- parsing, by the computer device, the theatrical track to retrieve the Internet of Things metadata with an Internet of Things theatrical parser hosted on the computer device; and
- managing the Internet of Things instructions with an Internet of Things broker.

* * * * *